(12) United States Patent
Howard (10) Patent No.: US 11,953,077 B2
(45) Date of Patent: Apr. 9, 2024

(54) CHAIN CONNECTOR (71) Applicant: Acteuro Limited, Worksop (GB)

(72) Inventor: Peter Howard, Taren Point (AU)

(73) Assignee: Advanced Chain Technologies (A.C.T.) PTY LTD, Taren Point (AU)

( * ) Notice: Subject to any disclaimer, the term of this patent is extended or adjusted under 35 U.S.C. 154(b) by 1156 days.

(21) Appl. No.: 16/612,081

(22) PCT Filed: May 9, 2018

(86) PCT No.: PCT/AU2018/050423
§ 371 (c)(1),
(2) Date: Nov. 8, 2019

(87) PCT Pub. No.: WO2018/204973
PCT Pub. Date: Nov. 15, 2018

(65) Prior Publication Data
US 2020/0141473 A1 May 7, 2020

(30) Foreign Application Priority Data
May 10, 2017 (AU) ................................ 2017901735

(51) Int. Cl.
*F16G 15/04* (2006.01)
*F16G 13/14* (2006.01)
*F16G 15/12* (2006.01)

(52) U.S. Cl.
CPC ............. *F16G 15/04* (2013.01); *F16G 13/14* (2013.01); *F16G 15/12* (2013.01)

(58) Field of Classification Search
CPC .......... F16G 13/14; F16G 15/00; F16G 15/02; F16G 15/04; F16G 15/06; F16G 15/12; F16G 15/10; E21C 25/36
See application file for complete search history.

(56) References Cited

U.S. PATENT DOCUMENTS

| 1,672,867 | A | * | 6/1928 | Bazeley | ................. F16G 15/02 59/85 |
| 4,606,188 | A | | 8/1986 | Osnes et al. | |
| 2009/0095035 | A1 | | 4/2009 | Mulle | |
| 2010/0037585 | A1 | | 2/2010 | Mülle et al. | |
| 2011/0265441 | A1 | | 11/2011 | Feuerstein | |

(Continued)

FOREIGN PATENT DOCUMENTS

| AU | 2013204673 A1 | * | 3/2014 | ............. F16G 15/04 |
| DE | 3701111 A1 | * | 8/1988 | ............. F16G 15/04 |
| DE | 29905675 U1 | | 8/2000 | |

(Continued)

*Primary Examiner* — Adam J Eiseman
*Assistant Examiner* — Jared O Brown
(74) *Attorney, Agent, or Firm* — The Webb Law Firm (57) ABSTRACT A vertical or block chain connector for linking between two closed chain links includes a lower element and an upper element configured to engage with the lower element to form the chain connector in an assembled condition. In use the lower element is disposed vertically below the upper element in the assembled connector. The upper element is a sliding fit with the lower element and the direction of the sliding connection is in a straight line perpendicular to the longitudinal axis of the connector and in a plane which is parallel to the horizontal axis when the connector is vertically oriented in use.

12 Claims, 4 Drawing Sheets (56) References Cited

U.S. PATENT DOCUMENTS

2013/0227927 A1      9/2013   Briscoe et al.
2017/0314642 A1 *  11/2017   Brodziak ................ F16G 15/02

FOREIGN PATENT DOCUMENTS

DE       202009007749 U1        10/2010
DE       202014103197 U1         7/2014
DE       202014103198 U1 *     8/2014    ............. F16G 15/02

* cited by examiner

CHAIN CONNECTOR

CROSS-REFERENCE TO RELATED APPLICATIONS

This application is the United States national phase of International Application No. PCT/AU2018/050423 filed May 9, 2018, and claims priority to Australian Provisional Patent Application No. 2017901735 filed May 10, 2017, the disclosures of which are hereby incorporated by reference in their entirety.

BACKGROUND OF THE INVENTION

TECHNICAL FIELD

This disclosure relates to a connector for a chain, and particularly to a vertical block connector for a mining chain.

DESCRIPTION OF RELATED ART

Mining chains are used in underground mining, particularly in longwall coal mining. Conditions in mines are tough and mining chains are subject to heavy wear and tear. Most commonly, mining chains are used to pull flight bars which in turn drag mined coal away from the coalface in troughs/channels sometimes referred to as a "chain conveyor".

Lengths of chain are connected to one another to make a closed loop of the required length using connectors, either flat connectors or vertical block connectors. 'Vertical' or 'vertical block type' connectors are used in a vertical orientation, with flat connectors typically used in a horizontal orientation.

Ideally, the connectors need to be as strong as the other links of the chain, but at the same time, they need to be separable to link/unlink the lengths of chain. They are expensive to manufacture as they typically require forging and machining, are prone to wear and fracture due to their complicated design and the rough treatment that the chains receive. One other common problem is that the pins which are used to hold the two parts of the connector together often work loose due to bearing load as the chain is dragged around its trough.

As mines produce more coal, the wear and tear on chains and connectors increases, and the longevity of the connectors decreases, requiring more frequent maintenance and replacement. Downtime also becomes more costly for mine operators as more coal production is lost. Existing connectors can be awkward to use—a connector design which is commonly used in Australia comprises two substantially identical components which close to form a closed link by moving the components together in the direction of travel of the chain to form a closed loop. However the design and operation of the components creates slack in the chain as the loop is closed which needs to be taken up before the chain is operated.

The creation of slack in the chain is not only time consuming and thus affects the mine's productivity, it also creates safety problems as the chain conveyor is typically located adjacent the coal face, which is always at some risk of collapsing. Underground workers carrying out repair or maintenance of the chain conveyor are at risk of being struck by coal from any collapse in the coal face, and the need to create and subsequently eliminate slack in the chain means that those workers are exposed to the danger of a collapse in the coal face for longer than may be necessary.

Where connectors do fail, the most common cause of failure is metal fatigue, rather than failure due to tensile stress.

SUMMARY OF THE INVENTION

It is a preferred aim of the present disclosure to provide a connector that is relatively inexpensive, preferably has a greater fatigue life and is thereby longer lasting so it needs replacing less frequently but also that can be removed and replaced in the chain conveyor more quickly.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

In a first aspect of the present disclosure, there is provided a vertical or block chain connector for linking between two closed chain links comprising a first element and a second element configured to engage with the first element at an interface to form the chain connector in an assembled condition, in use the first element being disposed vertically below the second element in the assembled connector wherein the upper element is a sliding fit with the lower element and the direction of the sliding connection is perpendicular to the longitudinal axis of the connector and in a plane which is parallel to the horizontal axis when the connector is vertically oriented in use.

It is preferred that the first element defines a first end wall, side walls projecting from each opposed end of the end wall, and a recess located between the side walls for receiving a chain link wherein male engaging formations are defined on the top of the side walls distal from the end wall, and wherein the second element comprises a second end wall which attaches to the top of the end walls and wherein corresponding female engaging formations are defined in the underside of the second element for receiving the male engaging formations such that the interface between the first and second elements is defined at the top of the side walls.

In a preferred embodiment, a central pillar extends from the centre of the first end wall to the second end wall with a recess for receiving a chain link being defined on each of the opposed sides of the central pillar, and wherein each recess defines a base and side walls extending up from the base and wherein the side walls are about the same height as the height of the links of the chain when oriented horizontally.

Typically, the depth of each recess measured from the base of the recess to the top of the adjacent end wall is approximately the same as the width/diameter of the recess at its widest.

In a preferred aspect at least two bores extend through the upper and lower elements for receiving pins connecting the same, and the at least two bores are oriented in a non-parallel axis to one another.

Typically, with respect to a notional horizontal plane passing through the centre of the assembled connector, the bores for the pins will extend at an angle to that plane, typically from 30 to 60° to that plane.

Having the pins extending in different directions rather than the same direction, and in particular in a non-horizontal plane means that the chances of all the pins working free due to vibrations, load bearing or the like are much reduced.

The length of the pins is such that they can be easily driven clear to allow separation before being limited by the conveyor deck.

In a second aspect of the disclosure, there is provided a vertical or block chain connector for linking between two closed chain links defining a body and comprising a first element and a second element configured to engage with the first element to form the chain connector body in an assembled condition, an interface being defined between the first and second elements in a connected state, the body being symmetrical about a plane of symmetry which bisects the body in a horizontal plane when in use, with the first element disposed vertically below the second element and wherein the upper element is a sliding fit with the lower element and the direction of the sliding connection is perpendicular to the longitudinal axis of the connector and in the horizontal plane, when the connector is vertically oriented in use, and wherein the interface is offset from the plane of symmetry.

In a further aspect, there is provided a chain comprising a plurality of links and a chain connector connecting at least two links wherein the chain connector is vertical or block chain connector and comprises a vertical or block chain connector for linking between two closed chain links comprising a first element and a second element configured to engage with the first element at an interface to form the chain connector in an assembled condition, in use the first element being disposed vertically below the second element in the assembled connector wherein the upper element is a sliding fit with the lower element and the direction of the sliding connection is perpendicular to the longitudinal axis of the connector and in a plane which is parallel to the horizontal axis when the connector is vertically oriented in use.

Preferably, the first element defines a first end wall, side walls projecting from each opposed end of the end wall, and a central pillar extending from the centre of the first end wall with a recess for receiving a chain link being defined on each side of the central pillar, and wherein each recess defines a base with the side walls and pillar extending up from the base wherein the side walls and central pillar are about the same height as the height of the links of the chain when oriented horizontally and wherein male engaging formations are defined on the top of the side walls distal from the end wall, and wherein the second element comprises a second end wall which attaches to the top of the end walls and wherein corresponding female engaging formations are defined in the underside of the second element for receiving the male engaging formations such that the interface between the first and second elements is defined at the top of the side walls.

Advantageously, in use, with the chain connector body oriented in a vertical plane with the first element is disposed vertically below the second element, and the links of the chain horizontally oriented in a plane which is perpendicular to the vertical plane of the connector body, the first element may be removed from the second connector by sliding, substantially without interference from the links.

BRIEF DESCRIPTION OF DRAWINGS

A specific embodiment of the present disclosure will now be described, by way of example only, and with reference to the accompanying drawings in which.

DESCRIPTION OF THE INVENTION

Figure 1:
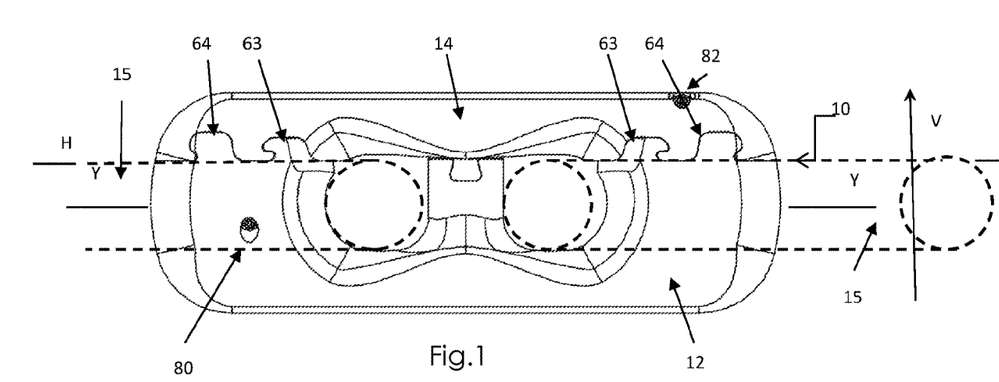
FIG. 1 is a front view of a chain connector.
Figure 2:
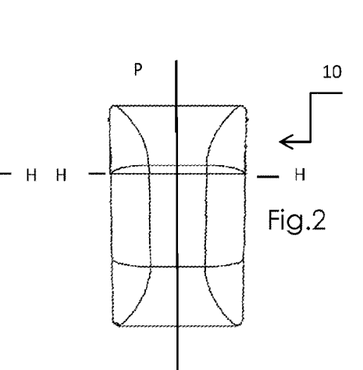
FIG. 2 is an end view of the chain connector of FIG. 1.
Figure 3:
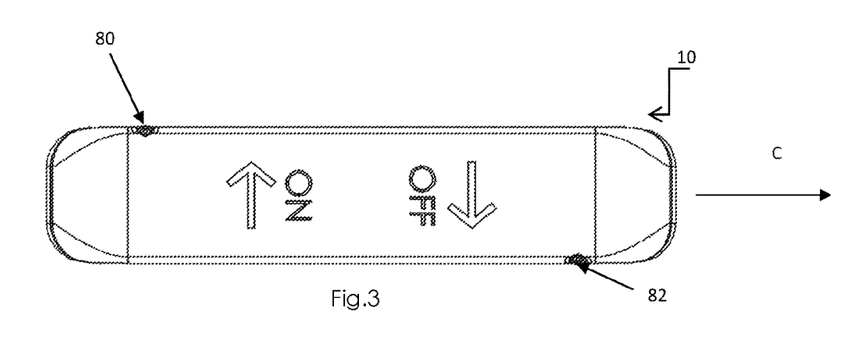
FIG. 3 is a top plan view of the chain connector of FIG. 1.
Figure 4:
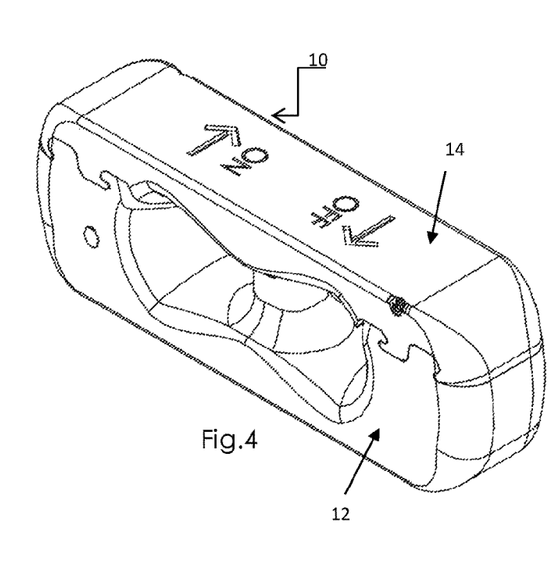
FIG. 4 is a perspective view of the chain connector of FIG. 1.

Referring to the drawings, FIGS. 1 to 4 show an assembly of a chain connector block or body 10 according to a first embodiment of the disclosure. Also shown in FIG. 1 in dashed lines is the outline of horizontal links 15 of a chain to be connected by the connector. The chain connector includes a generally w-shaped stirrup or first or lower element 12 and an second or upper element 14 or top/lid which mates with the lower portion to close the connector to provide two closed rings which retain the horizontal chain links 15. The chain connector 10 is of the block/vertical type, that is to say in operation the chain connector is used upright as shown in FIG. 1, in a vertical plane V, with the connected chain links being in a horizontal plane. The chain is typically used to drag flight bars in a chain conveyor (not shown) and in use the upper element 14 is disposed above the lower element 12, when dragging mined coal, ore or the like, and on its return journey, the vertical positions of the two elements are reversed. The lower part 12 of the connector passes through the sprockets of the conveyor.

As is best seen in FIG. 1 the assembled connector body 10 is symmetrical about a line/plane Y-Y which bisects the connector body, in a horizontal plane, as oriented in FIG. 1.

Figure 5:
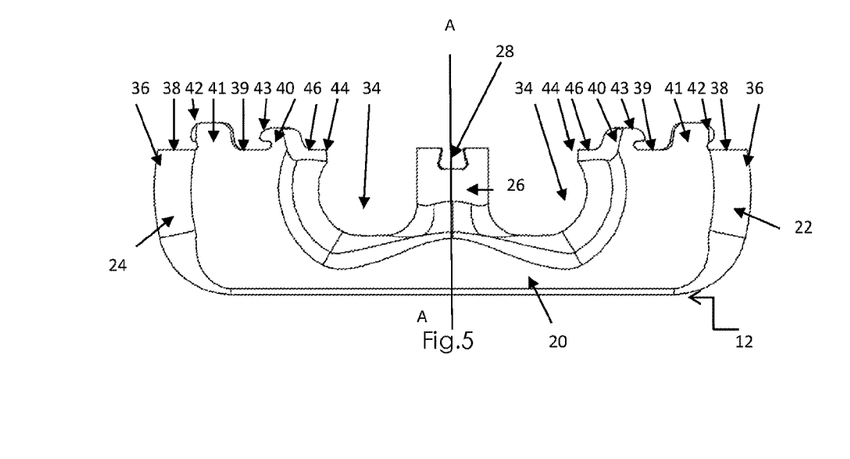
FIG. 5 is a side view of a lower element of the connector shown in FIG. 1.
Figure 6:
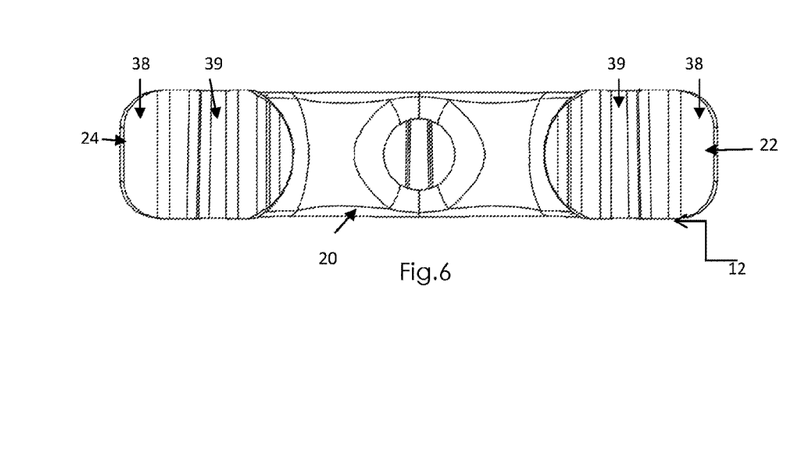
FIG. 6 is a top plan view of the lower element shown in FIG. 5.
Figure 7:
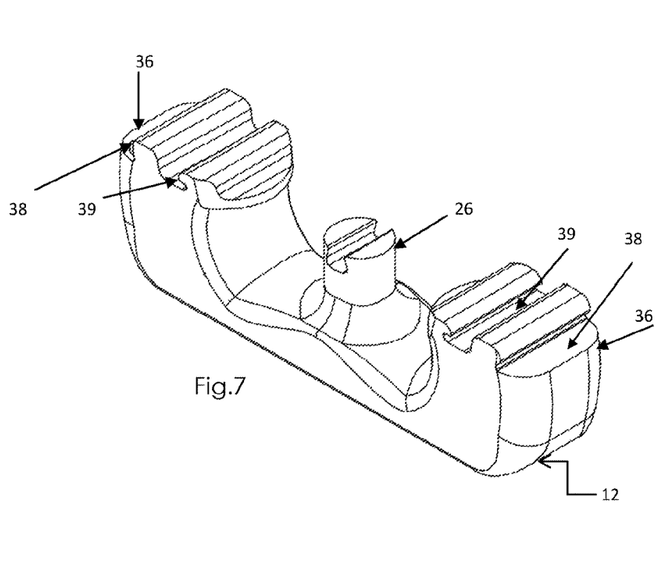
FIG. 7 is a perspective view of the lower element shown in FIG. 5.
Figure 8:
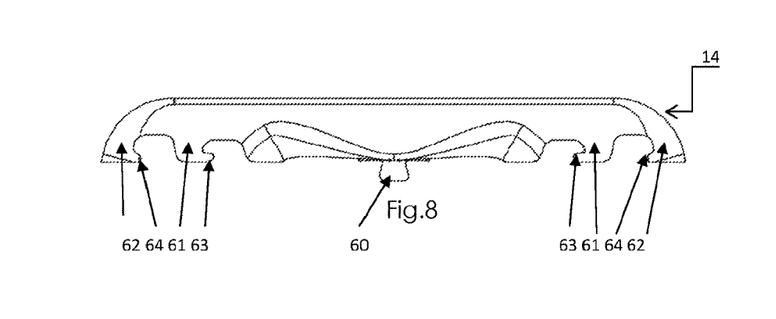
FIG. 8 is a side view of an upper element of the connector shown in FIG. 1.
Figure 9:
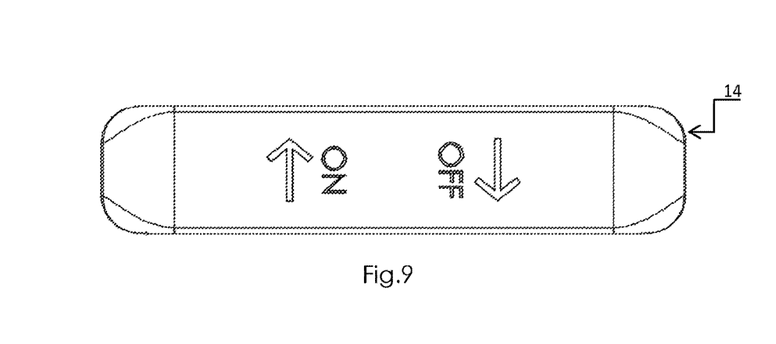
FIG. 9 is a top plan view of the upper element shown in FIG. 8.
Figure 10:
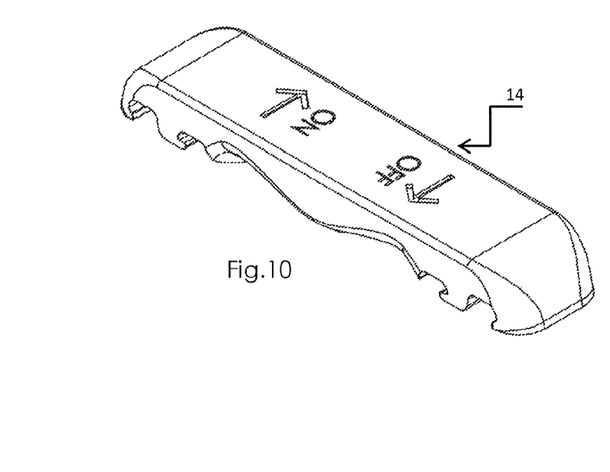
FIG. 10 is a perspective view of the upper r element shown in FIG. 9.
Figure 11:
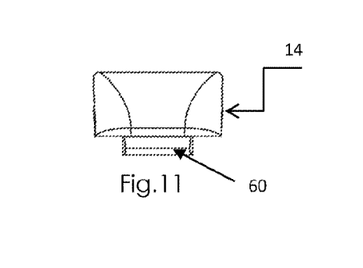
FIG. 11 is an end view of the upper element shown in FIG. 9.
Figure 12:
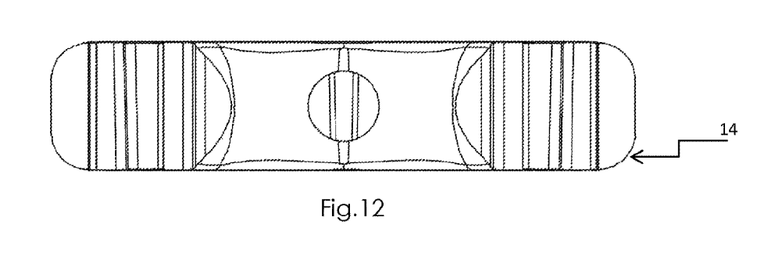
FIG. 12 is an underneath plan view of the upper element shown in FIG. 9.

FIGS. 5 to 7 show the lower element 12 in more detail. It is symmetrical (mirror imaged) about a central vertically extending plane/axis V passing through the central axis A of the lower element 12. It defines a longitudinally extending first end wall or base 20 and two curved end walls 22, 24 which extend upwards from each end of the base. A central pillar 26 projects up along the axis A and the top of the pillar defines a dovetail slot 28 or socket The central pillar 26 divides the lower element 14 into two U-shaped zones 34 for receiving horizontal chain links 15.

The top of each end wall 24, 22 defines engaging formations for connecting the lower element 12 to the upper element 14. In particular, at the top end 36 of each end wall, there is an adjacent base or floor 38. To the inside of that floor, a first boss 41 projects up from the floor and on the other side of the boss 40 there is a further base or floor 39, which is generally co-planar with the floor 38. To the inside of that floor, a further boss 40 projects up from the floor and on the other side of the boss 40 there is a further base or floor 46. One side of the top of each of the bosses 41, 40 defines a horizontally extending flange 42, 43 respectively which overlies part of the floor 38, 39 respectively.

The depth of each U-shaped zone 34 measured from the base of the U-shaped zone to the floor 46 of the adjacent end wall to is approximately the same as the width/diameter of the U shaped zone at its widest.

As is best seen by reference to FIG. 1, the bottom of the upper element 14 has a complementary configuration to the upper surface of the lower element and defines complementary mating configurations so that the elements connect and are a close sliding fit with one another, with minimal clearance.

FIGS. 8 to 12 show the upper element 14 in more detail. The upper element forms the second end wall of the connector body, when closed, and connects to the side walls of the lower element More particularly, the upper element defines a pair of shaped apertures 64, 63 which are shaped and configured to receive the spaced bosses 41 and 40 defined on top of the side walls of the lower element 12. The centre of the upper element defines a depending dovetail 60 which slides into the corresponding slot 28 of the central pillar.

Although it is not immediately apparent from the drawings, the cross-section of the upper element is not quite constant but is slightly tapered, as are the corresponding mating parts of the lower element, so that the elements can only be mated together in one direction, indicated by the ON arrow in the Figures, and can be easily separated. The components may be separated, when required, by moving the upper element in the opposite direction shown by the OFF arrow. It is to be noted that the attachment of the upper element to the lower element is by movement of the upper element in a direction which is perpendicular to the direction of movement of the connector in use (illustrated by the arrow C in FIG. 3). It is to be noted that the direction of sliding movement to connect the components is perpendicular to the direction of movement of the chain in use and in a horizontal plane (i.e. towards the side walls of the trough of the conveyor) when the connector is vertically oriented as shown in FIG. 1.

This feature has a number of key advantages over the prior art. First, in contrast with connectors in which components slide together in the direction of movement of the connector/chain in use in order to connect the links, the connector described herein will not generate significant slack in the chain during the closure of the connector. Secondly, removal of the upper element is transverse to the direction of movement of the chain. There is limited working space inside the channel in which the chains and flight bars are located, and it is relatively easy for a technician to remove the upper element by striking the upper element e.g. with a sideways blow with a hammer transverse to the direction of movement of the chain.

Figure 13:
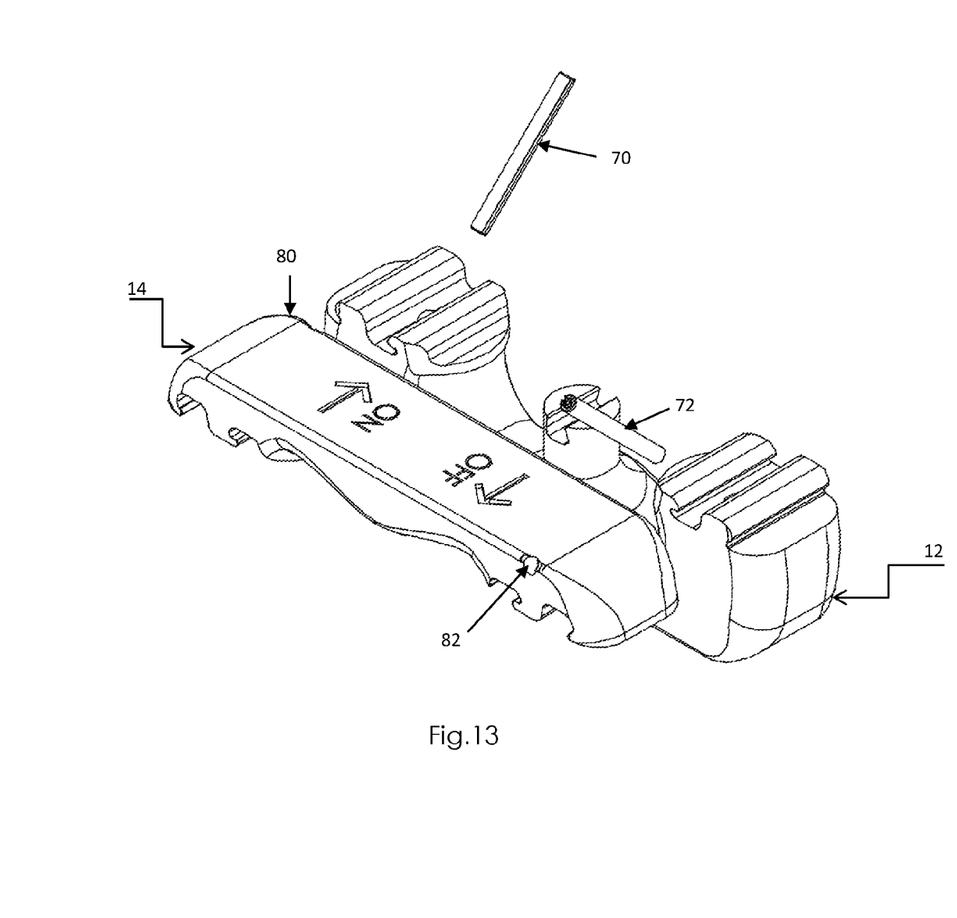
FIG. 13 is an exploded view of the connector also showing locking pins.

The upper element is secured to the lower element using angled locking pins 70, 72 (these are typically split roll pins) passing through bores 80, and 82 in the upper and lower elements which align when the elements are connected. The bores all extend at an angle to the horizontal plane Y-Y (see FIG. 1). Also, the bores 80 and 82 extend at an angle to a notional plane P (see FIG. 2) passing along the length of the connector. The bores are oriented at an angle of about 45° to the horizontal plane in use. Typically the angles will be from 30 to 60°.

The pins, being located with their heads near the uppermost part of the chain connector, are easy to access for removal. Because the pins pass through the connector at an angle to the horizontal, in particular at two differing angles at least, the pins may be less likely to work loose than in prior connectors where the pins are all aligned in the same horizontal plane. Furthermore, complete disengagement of the upper element from the lower element is allowed, since the pins are clear of the upper element before contacting the deck of the armoured face conveyor in which the chain is located.

With reference to FIG. 1, there are a number of design features of the connector design that enable the connector to be removed and replaced without having to significantly reduce the tension in the chain.

First, the side walls of the U-shaped receptacles 34 are generally planar at 44. This makes it easier to insert a horizontal link and avoids loss of tension when the horizontal link is dropped into the connector as happens with existing designs. In this way, in contrast with existing connector designs, the chain does not have to be tensioned higher to generate more slack to allow the horizontal link to drop into the connector, after which time the link settles back into the contacting arcs of the connector and loses some tension.

Secondly, with reference to FIG. 1 in particular, when the chain links 15 are in a horizontal position, the upper element 14 can be slid relative to the lower element 12 to open and/or close the connector. That is because the engaging formations are on the top of the walls 24, 22 and the height of the walls 24, 22 is about the same or above the height of the links of the chain when horizontal which are in a plane H-H. In most connectors the links typically have to be angled/non-horizontal to close the connector, typically in an inverted V and the connector cannot be closed with the links in the horizontal orientation shown in FIG. 1. It is further to be noted that in the interface between the upper element and the lower element where the upper element interfaces with the walls of the lower element the upper element defines recesses, and only in the centre of the upper element does an engaging formation 60 depend from the upper element into the plane defined by the upper surface of the chain links.

Again with reference to FIG. 1, a further advantage of the high walls 24, 22 is that the line of the connection or interface between the walls and the upper element is generally above the plane Y-Y which bisects the assembled connector body and above the links 15 and more particularly, above the plane H-H. Also, the interface does not cross intersect or cross the plane Y-Y. When the chain conveyor is being dragged around, the links 15 impact on the solid material of the walls 24, 22 of the lower element 12 and not on the weaker line of connection/interface between the upper and lower elements, which is more prone to fatigue and wear. This may increase the useful working life of the connector.

It is to be further noted that most of the strength of the connector is in the lower part of the connector, and the load pins are only required to hold the upper element in position, hence unlike some prior art connectors, the pins are not placed under significant load. The taper also ensures that the connection is tight and not floating and the pins are easier to insert in the pin holes.

Advantageously, in the above design, as the strength of the connector is largely in the lower element, even where the upper element fails, the lower section will retain the required mechanical properties and retain the links even after that failure, which reduces the risk of damage to the machinery in the event of failure of the upper element.

A further advantage of the present disclosure is that it does not need to be installed in a particular direction relative to the direction of travel. Most if not all current vertical block connectors must be installed in a particular direction otherwise or they will come apart immediately if the pins fail.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A vertical block chain connector configured for linking between two closed chain links of a mining chain, the connector comprising a first element and a second element configured to engage with the first element at an interface to form the chain connector in an assembled condition, in use the first element being disposed vertically below the second element in the assembled vertical block chain connector,
    wherein the first element defines a base defining a longitudinal axis extending from a first end wall to a second end wall, the first and second end walls extending up from opposed ends of the base, and further defines a central pillar extending up from the base between the end walls with a recess for receiving a chain link being defined on each side of the central pillar,
    wherein first engaging formations are defined on a top of the end walls and complementary engaging formations for engaging the first engaging formations are defined on the second element,
    wherein the end walls are about the same height measured from the base as the height of the links of the chain, or higher, when the links received in the recesses are oriented horizontally in use,
    wherein the interface between the first and second elements is defined at the top of the end walls,
    wherein the second element is a sliding connection with the first element, and
    wherein the direction of the sliding connection is a substantially straight line perpendicular to the longitudinal axis of the connector and in a plane (Y-Y) which is parallel to the base, the arrangement being such that the second element is configured to be slidably removed from the first element while the chain links received in the recesses are disposed in a horizontal orientation.

2. The vertical block chain connector as claimed in claim 1, wherein male engaging formations are defined on the top of the side walls distal from the base, wherein the second element comprises an end wall which attaches to the top of the end walls and wherein corresponding female engaging formations are defined in an underside of the second element for receiving the male engaging formations such that the interface between the first and second elements is defined at the top of the side walls.

3. The vertical block chain connector as claimed in claim 2, wherein the male engaging formations and the corresponding female engaging formations are shaped and configured to be a sliding mating fit with minimal clearance and wherein the male engaging formations and the corresponding female engaging formations are tapered so that the first and second elements can only be connected in one direction.

4. The vertical block chain connector as claimed in claim 1, wherein a depth of each recess measured from the base of the recess to the floor of the adjacent end wall is approximately the same as the width of the recess at its widest.

5. The vertical block chain connector as claimed in claim 1, further comprising a dovetail joint associated with the central pillar of the connector.

6. The vertical block chain connector as claimed in claim 1, wherein the first element and the second element define at least two bore holes for receiving locking pins when the connector is in the assembled condition and wherein the axes of the at least two bore holes are not parallel to each other.

7. The vertical block chain connector as claimed in claim 1, which may be installed in either direction relative to the direction of travel.

8. A mining chain comprising a plurality of links and a vertical block chain connector as claimed in claim 1.

9. A vertical block chain connector configured for linking between two closed chain links of a mining chain, the connector defining a body and comprising a first element and a second element configured to engage with the first element at an interface to form the vertical block chain connector in an assembled condition, in use, the interface being defined between the first and second elements in a connected state, the body being symmetrical about a horizontal plane of symmetry which bisects the vertical block chain connector in a horizontal plane when assembled in use,
    wherein the first element defines a base defining a longitudinal axis extending from a first end wall to a second end wall, the first and second end walls extending up from opposed ends of the base, and further defines a central pillar extending up from the base between the end walls with a recess for receiving a chain link being defined on each side of the central pillar,
    wherein first engaging formations are defined above and on the top of the end walls and complementary engaging formations for engaging the first engaging formations are defined on the second element,
    wherein the end walls are about the same height measured from the base as the height of the links of the chain, or higher, when the links received in the recesses are oriented horizontally in use,
    wherein the interface between the first and second elements is defined at the top of the end walls,
    wherein the second element is a sliding connection with the first element,
    wherein the direction of the sliding connection is a substantially straight line perpendicular to the longitudinal axis of the connector and in a plane (Y-Y) which is parallel to the base, the arrangement being such that the second element is configured to be slidably removed from the first element while the chain links received in the recesses are disposed in a horizontal orientation, and
    wherein when the connector is assembled in use, the interface is offset from the horizontal plane of symmetry.

10. The vertical block chain connector body as claimed in claim 9, wherein the interface does not intersect the plane of symmetry.

11. A mining chain comprising a plurality of links and a chain connector body connecting at least two links wherein the chain connector is a vertical block chain connector for linking between two closed chain links comprising a first element and a second element configured to engage with the first element at an interface to form the chain connector in an assembled condition,
    wherein the first element defines a base defining a longitudinal axis extending from a first end wall to a second end wall, the first and second end walls extending up from opposed ends of the base, and further defines a central pillar extending up from the base between the end walls with a recess for receiving a chain link being defined on each side of the central pillar, wherein first engaging formations are defined on a top of the end walls and complementary engaging formations for engaging the first engaging formations are defined on the second element, wherein the end walls are about the same height measured from the base as the height of the links of the chain, or higher, when the links received in the recesses are oriented horizontally in use, wherein the interface between the first and second elements is defined at the top of the end walls, wherein the second element is a sliding connection with the first element, and wherein the direction of the sliding connection is a substantially straight line perpendicular to the longitudinal axis of the connector and in a plane (Y-Y) which is parallel to the base, the arrangement being such that the second element is configured to be slidably removed from the first element while the chain links received in the recesses are disposed in a horizontal orientation.

12. The mining chain as claimed in claim 11, wherein, in use, with the chain connector oriented in a vertical plane with the first element is disposed vertically below the second element, and the links of the chain horizontally oriented in a plane which is perpendicular to the vertical plane of the chain connector, the second element is configured to be removed from the first element by sliding substantially without interference from the links.

* * * * *